US 6,792,335 B2
Sep. 14, 2004

(12) United States Patent
Ross et al.

(54) ROBOTIC APPARATUSES, SYSTEMS AND METHODS

(75) Inventors: William P. Ross, Saranac Lake, NY (US); James F. Hoburg, Baden, PA (US); Christopher Fromme, Sycamore, PA (US); John Bares, Wexford, PA (US); Mark DeLouis, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 10/153,942

(22) Filed: May 23, 2002

(65) Prior Publication Data

US 2002/0188380 A1 Dec. 12, 2002

Related U.S. Application Data

(60) Provisional application No. 60/292,948, filed on May 23, 2001.

(51) Int. Cl.[7] .............................................. G06F 19/00
(52) U.S. Cl. ....................... 700/245; 700/254; 700/257; 700/258; 700/260; 700/264; 104/281; 104/282; 104/138.1; 104/139; 104/283; 104/284; 104/286; 310/12; 310/90.5; 310/180; 310/181; 310/255
(58) Field of Search ................................ 310/90.5, 180, 310/181, 255, 12; 355/216, 299; 700/245, 254, 257, 258, 260, 264; 104/138.1, 139, 281–284, 286

(56) References Cited

U.S. PATENT DOCUMENTS

| 3,609,612 | A | | 9/1971 | Tibbling |
| 5,628,271 | A | | 5/1997 | McGuire ..................... 114/222 |
| 5,631,618 | A | * | 5/1997 | Trumper et al. .......... 244/75 R |
| 5,722,326 | A | * | 3/1998 | Post .......................... 523/204 |
| 5,723,917 | A | * | 3/1998 | Chitayat ..................... 104/282 |
| 5,886,432 | A | * | 3/1999 | Markle ........................ 310/12 |
| 6,072,251 | A | * | 6/2000 | Markle ........................ 310/12 |
| 6,101,952 | A | | 8/2000 | Thornton et al. |
| 6,104,108 | A | * | 8/2000 | Hazelton et al. .............. 310/12 |
| 6,111,332 | A | * | 8/2000 | Post ......................... 310/90.5 |
| 6,250,230 | B1 | * | 6/2001 | Post .......................... 104/281 |
| 6,287,389 | B1 | | 9/2001 | McGuire ................... 148/428 |

FOREIGN PATENT DOCUMENTS

| FR | 2145115 | 2/1973 |
| JP | 04002592 | 1/1992 |
| JP | 04002592 A | 1/1992 |

OTHER PUBLICATIONS

Baumgartner, Hotfoot for the iron horse, 2000, Internet, pp. 1–13.*

Penick, Magnetic levitation vehicles, 1998, Internet, pp. 1–1–12.*

Roberson, Indutrack simple magnetic levitation, 2001, Internet, pp. 1–11.*

Westernstates Manufacturing, 200, Internet, pp. 1–6.*

D. Trumper et al., "Magnet Arrays for Synchronous Machines," Industry Applications Society Annual Meeting, 1993.

(List continued on next page.)

*Primary Examiner*—Thomas G. Black
*Assistant Examiner*—McDieunel Marc
(74) *Attorney, Agent, or Firm*—Kirkpatrick & Lockhart LLP

(57) ABSTRACT

A mobile device for traversing a ferromagnetic surface. The device includes a frame and at least one surface contacting device attached to the frame. The device also includes a Halbach magnet array attached to the frame, wherein the Halbach magnet array provides a magnetic force to maintain the surface contacting device substantially into contact with the ferromagnetic surface.

5 Claims, 12 Drawing Sheets

OTHER PUBLICATIONS

English translation of French publication No. FR-2145115, 1973.

International Search Report issued in International Application No. PCT/US02/16452.

K. Halbach, "Application of Permanent Magnets in Accelerators and Electron Storage Ring," J. Appl. Phys. 57, pp. 3605–3609, Apr. 15, 1985.

Tramper, D. et al., "Magnet Arrays for Synchronous Machines," IEEE, 1993.

"The HydroCat™," printed from http://www.flowcorp.com/newsite/Products/hydrocat.htm on May 9, 2002.

"Hydro–Crawler," printed from http://www.jetedge.com/products/crawler.html on May 9, 2002.

"Flow HydroCat™ Project," Flow International Corp., 1999.

PCT International Search Report for Application No. PCT/US 02/16452, mailed Sep. 3, 2002.

* cited by examiner

ROBOTIC APPARATUSES, SYSTEMS AND METHODS

CROSS REFERENCE TO RELATED APPLICATION

The present invention claims priority under 35 U.S.C. 119 to U.S. Provisional Patent Application No. 60/292,948 filed May 23, 2001.

STATEMENT REGARDING FEDERALLY SPONSORED RESEARCH OR DEVELOPMENT

This invention was partially funded by the U.S. Government pursuant to NASA Grant No. NCC5-223. The U.S. Government may have certain rights in this invention.

BACKGROUND

Robotic devices have become increasingly prevalent in industrial settings where automation of hazardous, time-consuming, and precise operations is desirable. For example, robots have been employed to inspect and repair storage tanks, pipelines, and nuclear facilities, and to strip paint and to apply finishes.

In paint stripping operations, for example, the process of manually stripping paint and other finishes off of large structures such as storage tanks, ships, and bridges is a labor-intensive process that is often performed by humans using grit blasting or ultra high pressure (UHP) water jetting techniques and devices. Such techniques and devices, in addition to being labor-intensive, may also create waste disposal problems because, for example, in the case of grit blasting, the grit is intermixed with paint and coating particles (e.g. fungicides) and thus must be disposed of in an environmentally-friendly manner.

Various robotic devices have been developed for use in stripping paint from large structures. For example, the Flow Hydrocat™ manufactured by Flow International Corporation, uses a vacuum to attach to the surface being stripped. The Hydro-Crawler™, manufactured by JetEdge®, uses rigid magnetic tracks that attach to the surface being stripped and propel the robot on the surface.

SUMMARY

In one embodiment, the present invention is directed to a mobile device for traversing a ferromagnetic surface. The device includes a frame and at least one surface contacting device attached to the frame. The device also includes a Halbach magnet array attached to the frame, wherein the Halbach magnet array provides a magnetic force to maintain the surface contacting device substantially into contact with the ferromagnetic surface.

In one embodiment, the present invention is directed to a system. The system includes a generator and a mobile device in communication with the generator, the mobile device for traversing a ferromagnetic surface. The mobile device includes a frame, at least one surface contacting device attached to the frame, and a Halbach magnet array attached to the frame, wherein the Halbach magnet array provides a magnetic force to maintain the surface contacting device substantially into contact with the ferromagnetic surface.

In one embodiment, the present invention is directed to an apparatus for traversing a ferromagnetic surface. The apparatus includes a frame, surface contacting means, and magnetic means attached to the frame, wherein the magnetic means provides a magnetic force to maintain the surface contacting means substantially into contact with the ferromagnetic surface, and wherein the magnetic means is configured in use to be spaced from the ferromagnetic surface.

In one embodiment, the present invention is directed to a robotic device for operating on a ferromagnetic surface. The device includes a frame, at least one wheel attached to the frame, wherein the wheel has a polymeric coating on a surface that is configured to contact the ferromagnetic surface, and a Halbach magnet array attached to the frame, wherein the magnet array holds the wheel in substantially constant contact with the ferromagnetic surface and wherein the Halbach array is configured in use to be spaced from the ferromagnetic surface.

In one embodiment, the present invention is directed to a mobile device for traversing a ferromagnetic surface. The device includes a frame and at least one surface contacting device attached to the frame. The device also includes a magnet array attached to the frame, wherein the magnet array includes a plurality of magnet bars oriented such that the magnet array provides a magnetic force to maintain the surface contacting device substantially into contact with the ferromagnetic surface.

BRIEF DESCRIPTION OF THE DRAWINGS

Further advantages of the present invention may be better understood by referring to the following description taken in conjunction with the accompanying drawings, in which.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

Although the present invention is illustrated herein as being embodied as a robotic device that has paint stripping and removal capabilities, it can be understood that the principles of the present invention may be employed with devices that may perform a variety of tasks such as, for example, spraying finishes, machining, welding, and inspecting surfaces or structures.

Figure 1:
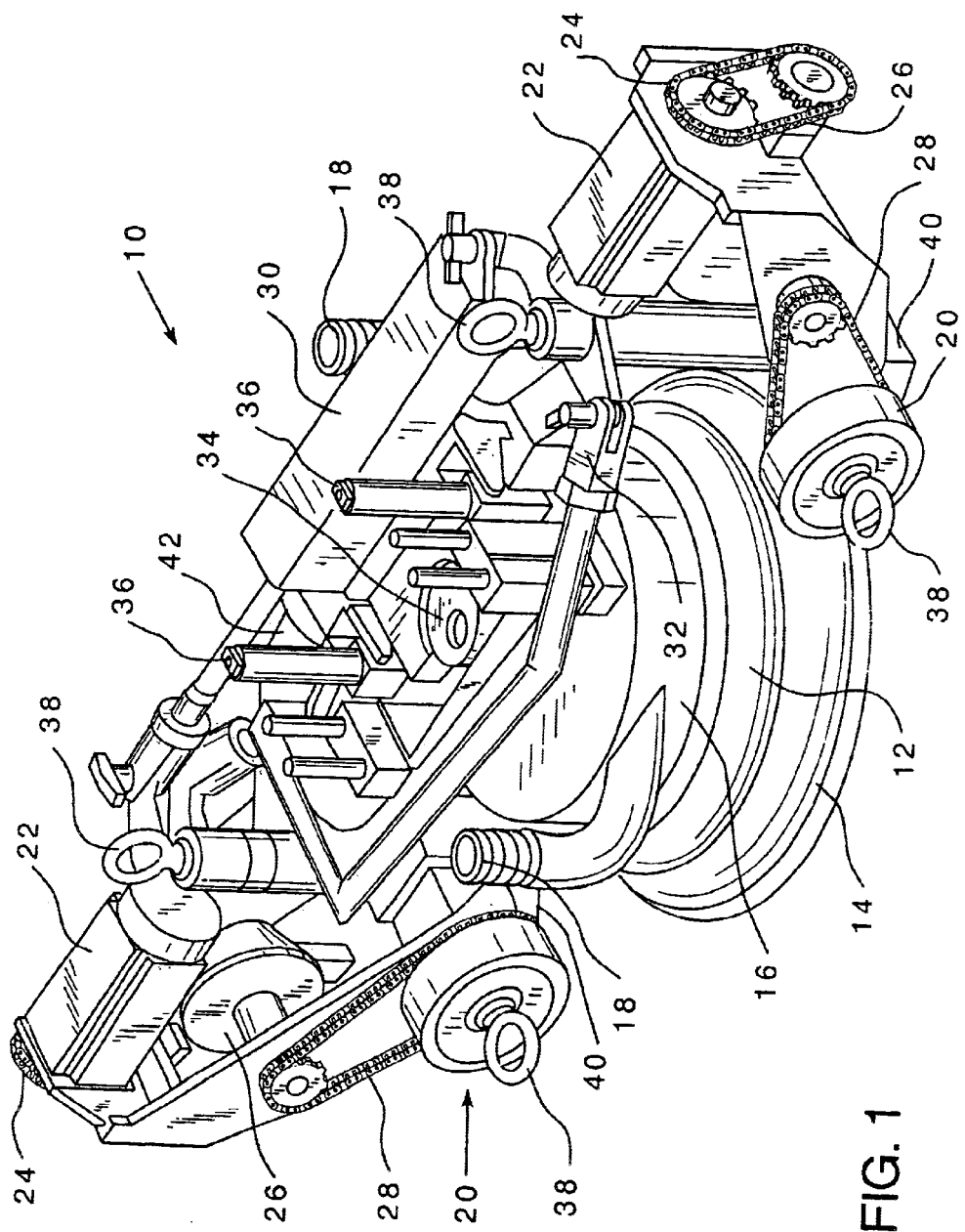
FIG. 1 is a diagram illustrating a robotic device according to one embodiment of the present invention.

FIG. 1 is a diagram illustrating a robotic device 10 according to one embodiment of the present invention. The device 10 includes a jet/vacuum assembly 12 that can be used for jetting fluids and vacuuming the fluids and removed particles after jetting. The assembly 12 includes a seal 14, a shroud 16, and ports 18. The seal 14 may be, for example, spring-loaded such that an adequate seal is maintained when the device 10 traverses an uneven or obstructed surface. Although the device 10 is illustrated in FIG. 1 as having one jet/vacuum system 12, it can be understood that multiple jet/vacuum systems may be included on the device 10.

The device 10 includes surface contacting devices, such as wheels 20 that contact the surface that is to be stripped of paints or coatings. The wheels may be constructed of, for example, a metal such as aluminum with a polymeric (e.g. urethane or polyurethane) coating of, for example, ¼" thickness. Such a coated wheel provides traction for the device 10 but does not mar the surface on which the device 10 is operating. It can be understood that any suitable type of surface contacting device may be used such as, for example, tracks or skids. Actuation devices, such as motors 22, provide power to the wheels 20 to provide locomotion for the device 10. The motors 22 may be, for example, sealed electric motors compliant with the National Electrical Manufacturers Association (NEMA) 17 standard. However, it can be understood that the actuation devices may include, in addition to or instead of electric motors, a hydraulic or pneumatic drive system.

The motors 22 are connected via chain drives 24 to differentials 26 and the differentials 26 are connected via chain drives 28 to the wheels 20. The differentials 26 may be, for example, limited-slip differentials. The chain drives 24 may provide, for example, a 1:1 to 2:1 reduction and the chain drives 28 may provide a 2:1 reduction. The differentials 26 may provide, for example, a 3.14:1 reduction. However, it can be understood that the drive system may include, in addition to or instead of chain drives, any of a variety of other devices for power transmission such as a hydraulic transmission, belt drive or gear drive.

The device 10 includes a steering system for providing, for example, four-wheel steering capability to the device 10. A steering actuator 30 controls a steering linkage 32 that provides directional movement of the wheels 20. The steering actuator 30 may provide, for example, 1200 lbs. of thrust. The linkage 32 may include, for example, pinned connections and the bushings for the steering system may be, for example, oil-impregnated bushings.

The device 10 includes an ultra high pressure (UHP) fluid connection 34 that accepts the fluid to be used for stripping, for example, water. The device 10 also includes air connections 36 that accept compressed air that can be used to provide downward force to hold the jet/vacuum assembly 12 against the surface on which the device 10 is operating and which can be used for a variety of other functions such as to raise and lower the jet/vacuum assembly 12.

The device 10 includes lifting/safety rings 38 that can be used to lift the device 10 in place using, for example, a crane or other lift device. One or more safety lines may be attached to the rings 38 to ensure that the device 10 does not fall to the ground if the device 10 loses contact with the surface on which it is operating.

In one embodiment, the device 10 is designed to operate on surfaces that are ferromagnetic, such as storage tanks and ship hulls. The device 10 is thus provided with magnets 40 to adhere the device 10 to such surfaces. The magnets 40 may be any type of suitable fixed magnet or electromagnet. In one embodiment, the magnets 40 are Halbach arrays constructed of, for example, neodymium-iron-boron (NdFeB), that provide, for example, 1400 lbs. to 2400 lbs. of pull, as described further hereinbelow. The presence of the magnets 40 allows for the device 10 to operate on structures that have inclined or vertical surfaces and allows for the device 10 to operate in an upside-down position on, for example, the bottom of the hull of a ship and provides so much surplus holding force that the device 10 can pull heavy loads (such as hoses full of water) vertically up the side of a smooth ferromagnetic structure even in the presence of water and oil on the surface. The magnets 40 may be designed and constructed, as described hereinbelow, such that the magnets 40 do not wear from contact with the surface on which the device 10 is operating and so that the magnets 40 do not mar the surface on which the device 10 is operating.

The various components of the device 10, including a frame 42, may be constructed of any suitable material such as, for example, plastic, stainless steel, titanium, aluminum, or coated steel.

Figure 2:
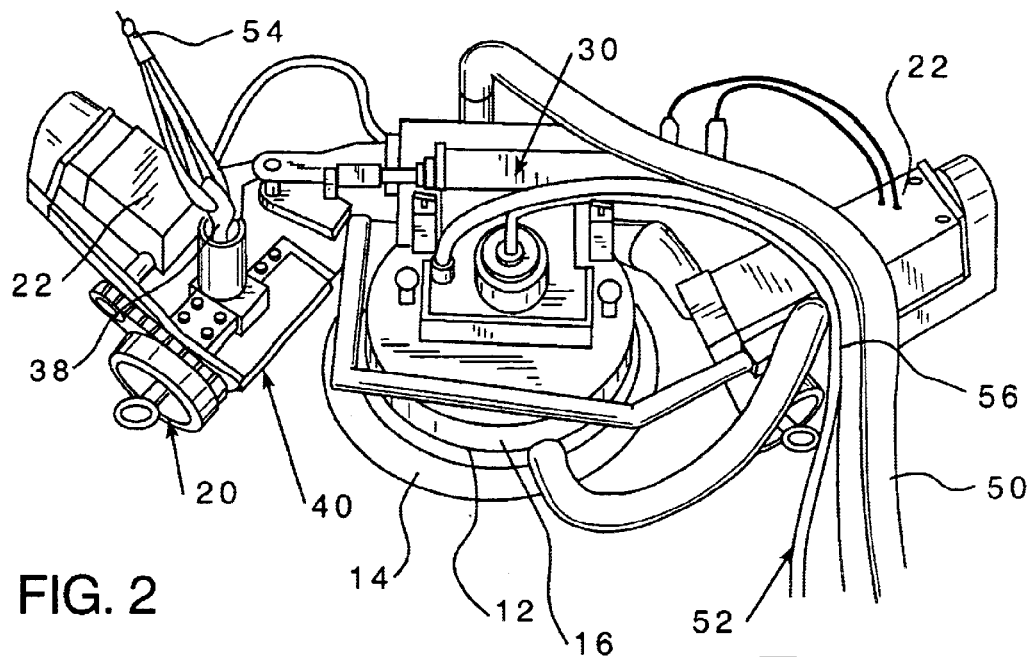
FIG. 2 is a diagram illustrating a top view of the robotic device of FIG. 1 according to one embodiment of the present invention.

FIG. 2 is a diagram illustrating a top view of the robotic device 10 of FIG. 1 according to one embodiment of the present invention. In addition to the elements shown in FIG. 1, the device 10 is illustrated in FIG. 2 having vacuum hoses 50, electrical cables 52, safety tether 54, and water supply hose 56 attached thereto.

Figure 3:
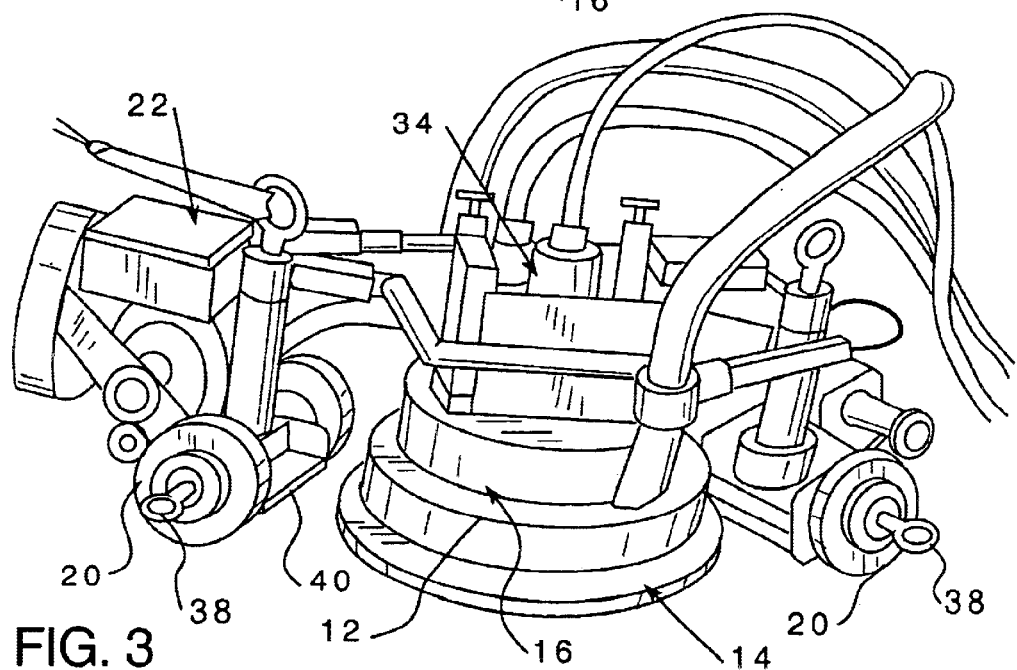
FIG. 3 is a diagram illustrating a side view of the robotic device of FIG. 1 according to one embodiment of the present invention.

FIG. 3 is a diagram illustrating a side view of the robotic device 10 of FIG. 1 according to one embodiment of the present invention.

Although the device 10 is illustrated in FIGS. 1-3 as having four wheels 20, it can be understood that any suitable number and configuration of wheels, tracks, skids, etc. may be used depending on the application for which the device 10 will be used and the desired handling characteristics of the device 10. For example, the device 10 could be implemented with various three-wheel configurations, four-wheel cart configurations, and four-wheel articulated configurations.

Figure 4:
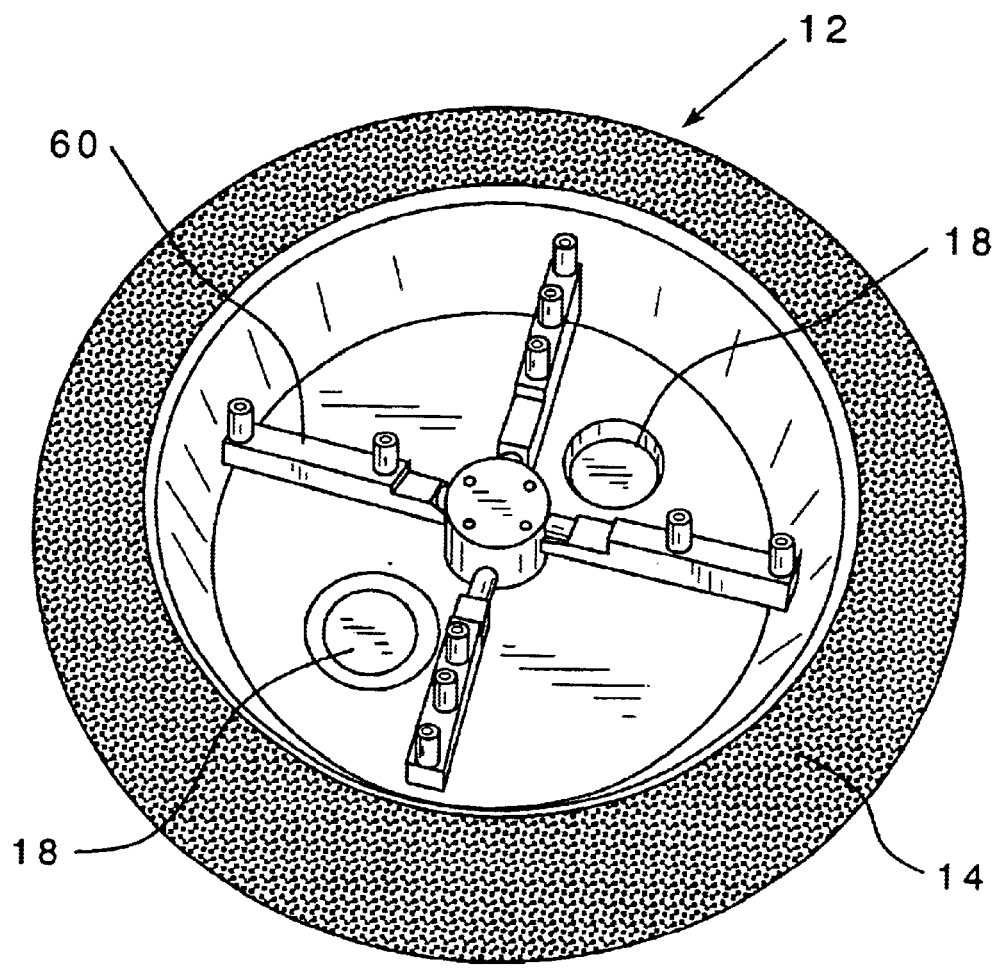
FIG. 4 is a diagram illustrating the jet/vacuum system of the robotic device of FIG. 1 according to one embodiment of the present invention.

FIG. 4 is a diagram illustrating a bottom view of the jet/vacuum system 12 of the robotic device 10 of FIG. 1 according to one embodiment of the present invention. The system 12 includes the seal 14. The seal 14 may be constructed from a flexible material such as, for example, polyurethane, that creates a seal with the surface on which the device 10 is operating and allows the device 10 to operate close to obstacles. A rotating spray assembly 60 includes, for example, multiple fluid outlets. The outlets may be, for example, sapphire spray jets. The spray assembly 60 may be an assembly sold by, for example, Hammelmann Corporation. The vacuum ports 18 carry away spent fluid and debris. In one embodiment, the jet/vacuum system 12 may be constructed to have a 16 inch diameter, although any suitable diameter of the system 12 may be used depending on the desired turning radius of the device 10.

Figure 5:
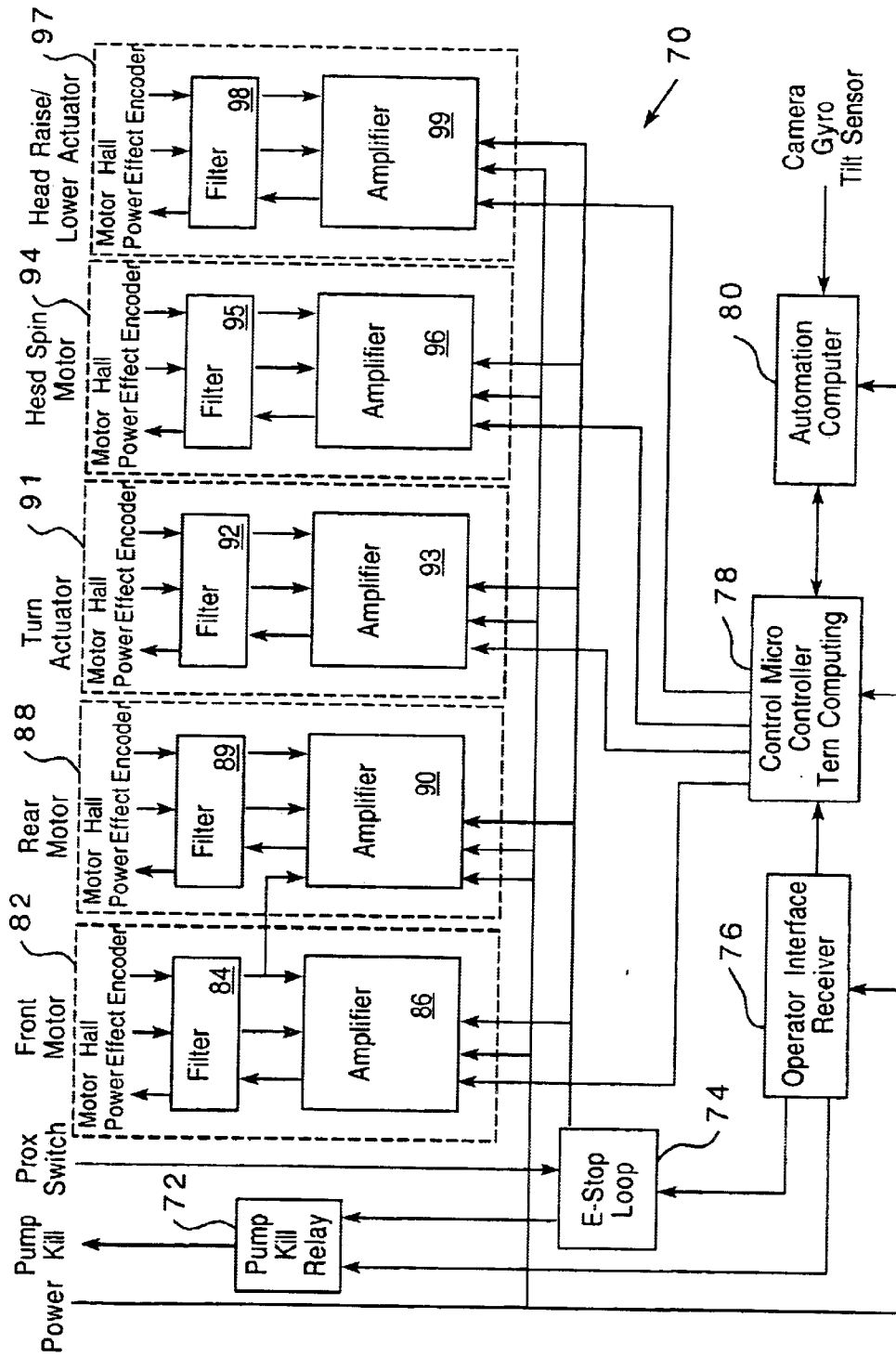
FIG. 5 is a simplified schematic diagram of an electrical control device located on the robotic device of FIG. 1 or located remote from the device according to one embodiment of the present invention.

FIG. 5 is a simplified schematic diagram of an electrical control device 70 located on the robotic device 10 of FIG. 1 or remote from the device 10 according to one embodiment of the present invention. The device 70 includes a pump relay kill 72 that can stop the operation of the jet/vacuum system 12. An emergency stop loop 74 allows the operator of the device 10 to stop the device 10 in the event of an emergency. An operator interface receiver 76 receives operator commands via, for example, a wireless control device. A control microcontroller 78 provides control signals for controlling various systems of the device 10. An automation computer 80 provides various automated functions for the device 10 as described hereinbelow. The computer 80 receives input from, for example, one or more cameras located on the device 10 and a gyro tilt sensor.

A front motor control circuit 82 includes a filter 84 and an amplifier 86 and a rear motor control circuit 88 includes a filter 89 and an amplifier 90. A turn actuator circuit 91 includes a filter 92 and an amplifier 93. A jet/vacuum system (head) spin motor circuit 94 includes a filter 95 and an amplifier 96 and a jet/vacuum system (head) raise/lower actuator circuit 97 includes a filter 98 and an amplifier 99. The amplifiers 86, 90, 93, 96, and 99 may be, for example, Emerson EN208 amplifiers with FM3.

Figure 6:
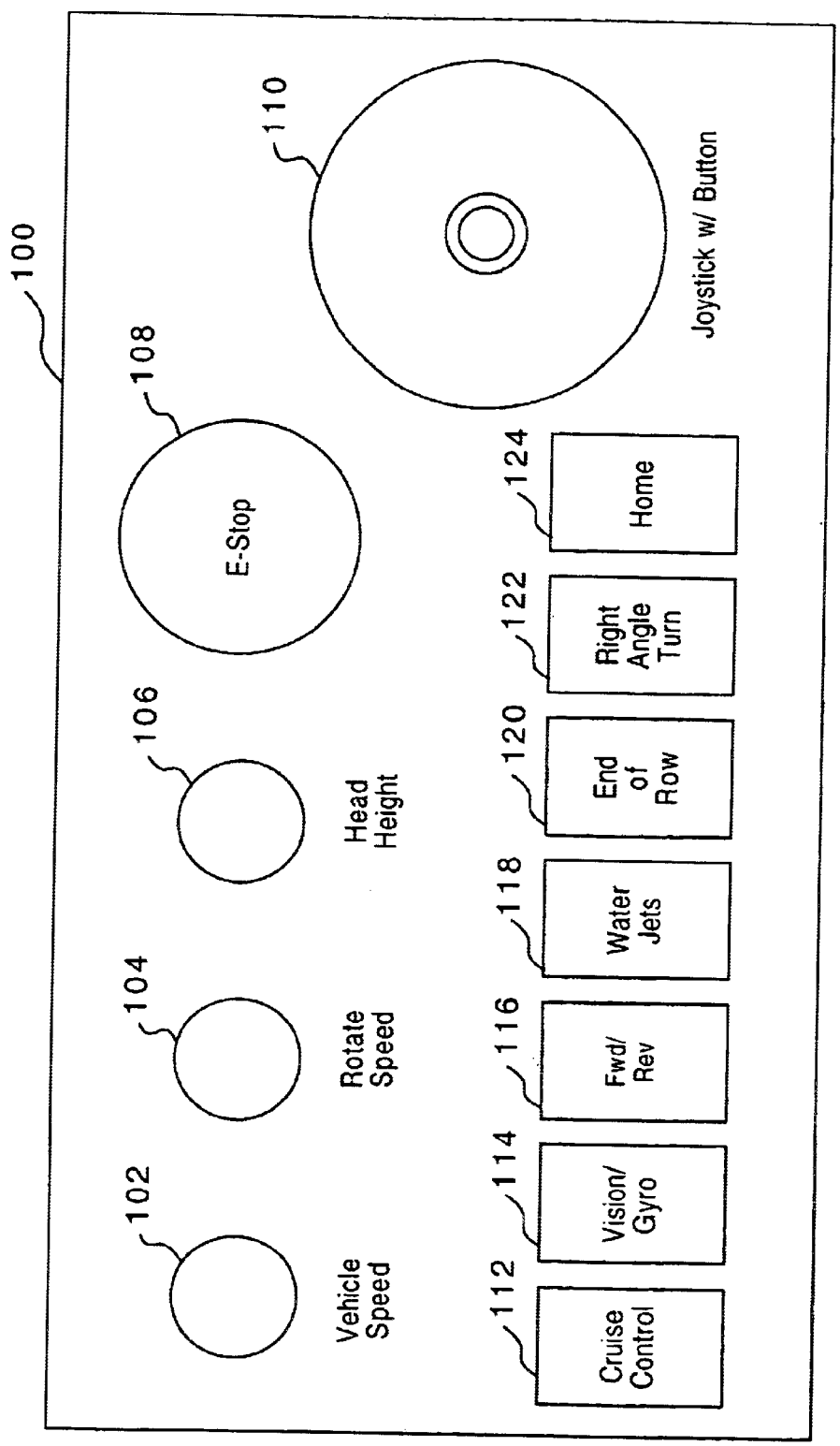
FIG. 6 is a simplified diagram illustrating a control panel of a wireless control device for controlling the robotic device of FIG. 1 according to one embodiment of the present invention.

FIG. 6 is a simplified diagram illustrating a control panel 100 of a wireless control device for controlling the robotic device 10 of FIG. 1 according to one embodiment of the present invention. The control device on which the control panel 100 is located may be any type of control device such as a wireless or a wireline control device. A vehicle speed control dial 102 allows the operator of the device 10 to control the speed of the device 10. A rotate speed dial 104 allows the operator of the device 10 to control the rotate speed of the device 10 and a head height dial 106 allows the operator of the device 10 to adjust the height of the jet/vacuum system 12. An emergency stop button 108 allows the operator of the device 10 to stop the device 10 in the event of an emergency.

A joystick 110 provides for basic control of the device 10 and allows the operator of the device 10 to easily control the direction of the device 10 during operation. A cruise control button 112 enables and disables an automatic cruise control function of the device 10. A vision/gyro button 114 enables control of the device 10 by a computer vision system. A forward/reverse button 116 allows the operator of the device 10 to change the direction of the device 10. A water jet button 118 allows the operator of the device 10 to start and stop the flow of water to the jet/vacuum system 12. An end of row button 120 allows the operator of the device to cause the automatic, computer-vision controlled drive to turn the device 10 around. A right angle turn button 122 allows the operator of the device 10 to efficiently cause the device 10 to make a right angle turn during operation. A home button 124 allows the operator of the device 10 to set the desired center position for the steering joystick.

Figure 7:
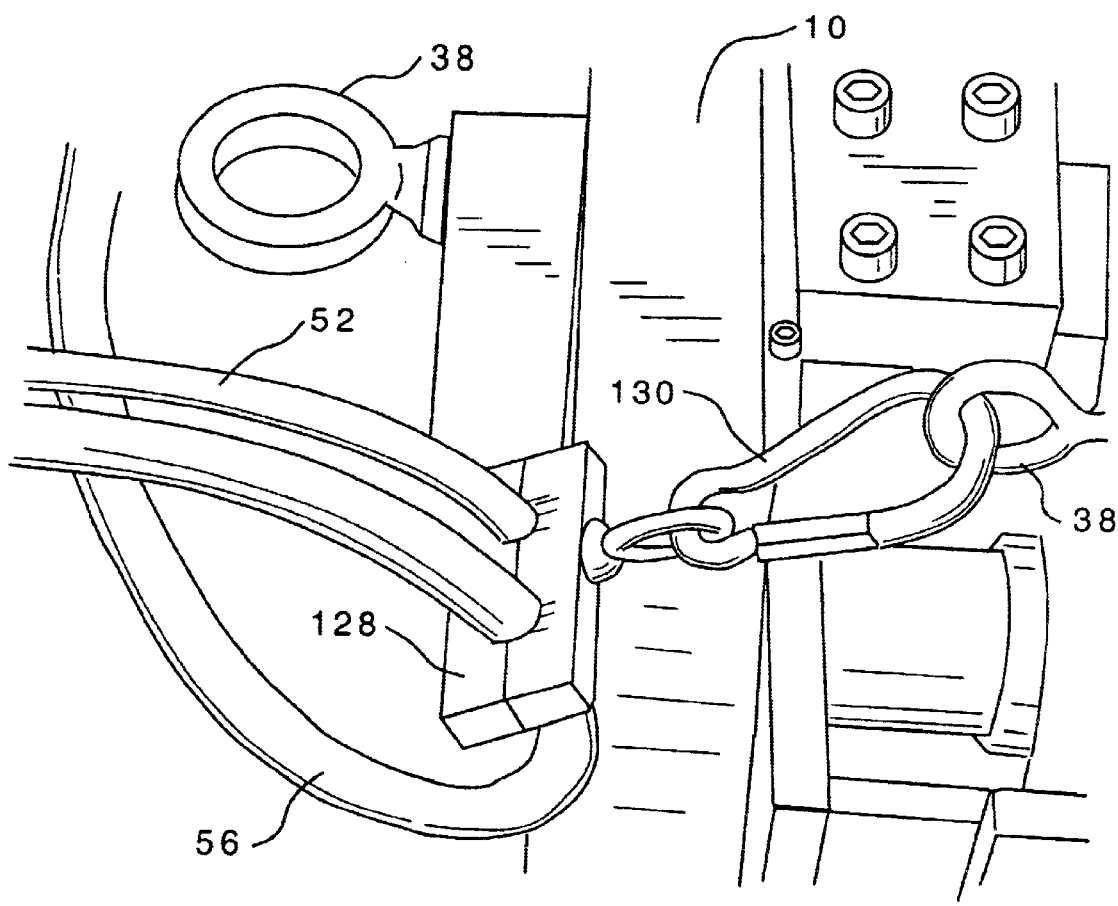
FIG. 7 is a diagram illustrating a strain relief connector that can be used in conjunction with the robotic device of FIG. 1 according to one embodiment of the present invention.

FIG. 7 is a diagram illustrating a strain relief connector 128 that can be used in conjunction with the robotic device 10 of FIG. 1 according to one embodiment of the present invention. The connector 128 may connect to one of the lifting/safety rings 38 via a clip 130. The connector 128 relieves the strain on the cables and hoses 52, 56 during operation of the device 10.

Figure 8:
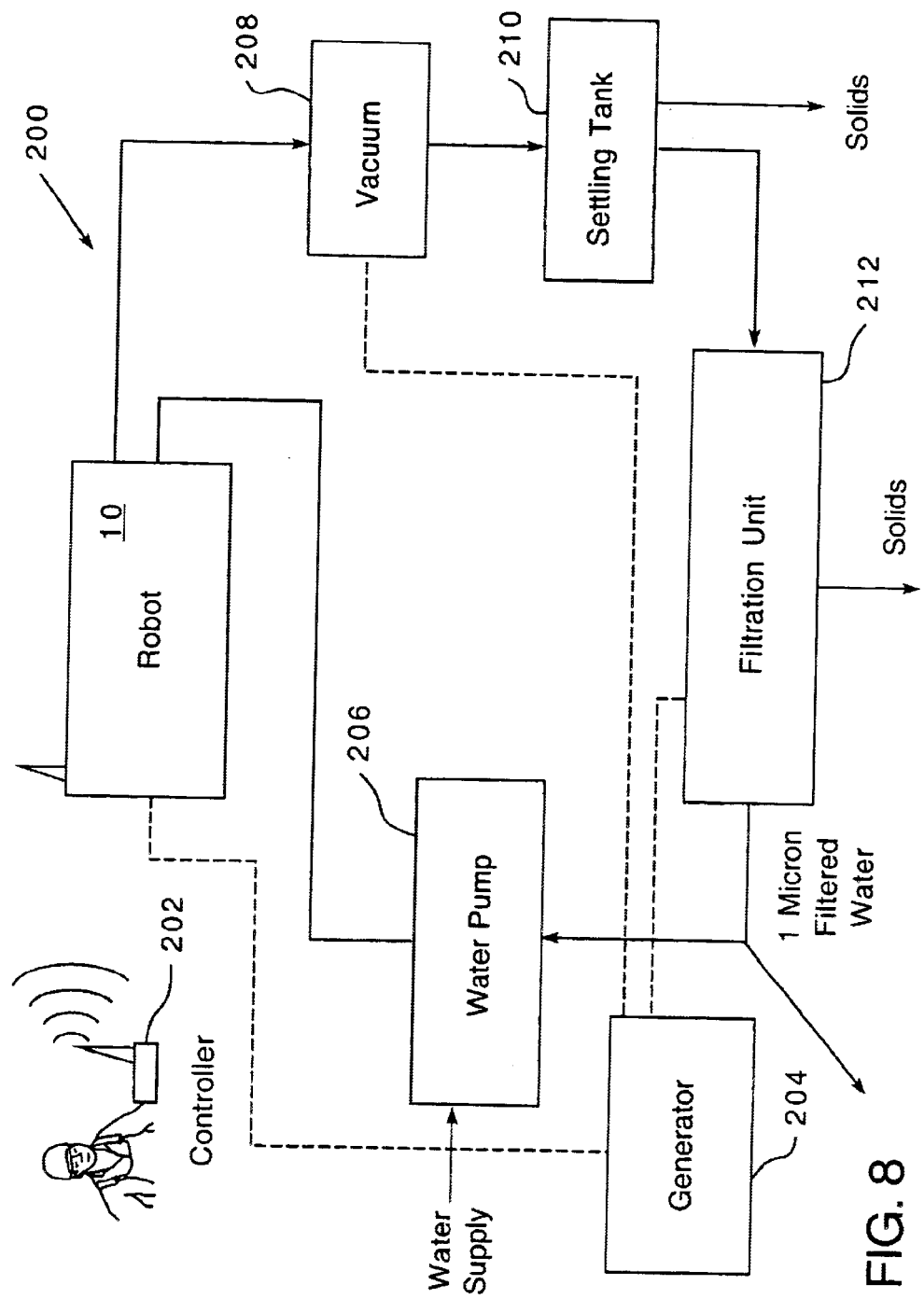
FIG. 8 is a diagram illustrating a system in which the robotic device of FIG. 1 may be used according to one embodiment of the present invention.

FIG. 8 is a diagram illustrating a system 200 in which the robotic device 10 of FIG. 1 may be used according to one embodiment of the present invention. FIG. 8 illustrates the case where the device 10 includes a jet/vacuum system 12 for stripping paint and coatings from a surface using UHP water. A controller 202, on which the control panel 100 of FIG. 6 may be located, may be used by an operator to control the device 10. The controller 202 may be, for example, a wireless or radio control device. A generator 204, such as an enclosed diesel generator, provides electrical power to the device 10 and various other components of the system 200. A water pump 206, such as a diesel water pump, supplies water to the jet/vacuum system 12 of the device 10. A vacuum 208, such as an electric vacuum, vacuums spent water and removed particles via the jet/vacuum system 12 of the device 10. In one embodiment, the vacuum 208 is a 56 kW vacuum that pulls approximately 128 $m^3$ per minute through the jet/vacuum system 12 with a vacuum of approximately 38 cm Hg.

The output of the vacuum 208 enters a settling tank 210 in which solid waste settles for removal. The liquid portion of the settling tank 210 is directed to a filtration unit 212, such as an enclosed ultra filtration unit, where solids are filtered. In one embodiment, the filtration unit 212 includes a centrifuge that removes the solid waste. In one embodiment, the filtration unit 212 includes a sand filter and a secondary filter that is tailored to remove dissolved chemicals that are expected to be in the water vacuumed from the jet/vacuum system 12. The filtered water output from the filtration unit 212 may be recycled in the system 200 by the water pump 206 or may be returned to the environment. In one embodiment, the water output from the filtration unit 212 is 1 micron filtered water.

Figure 9:
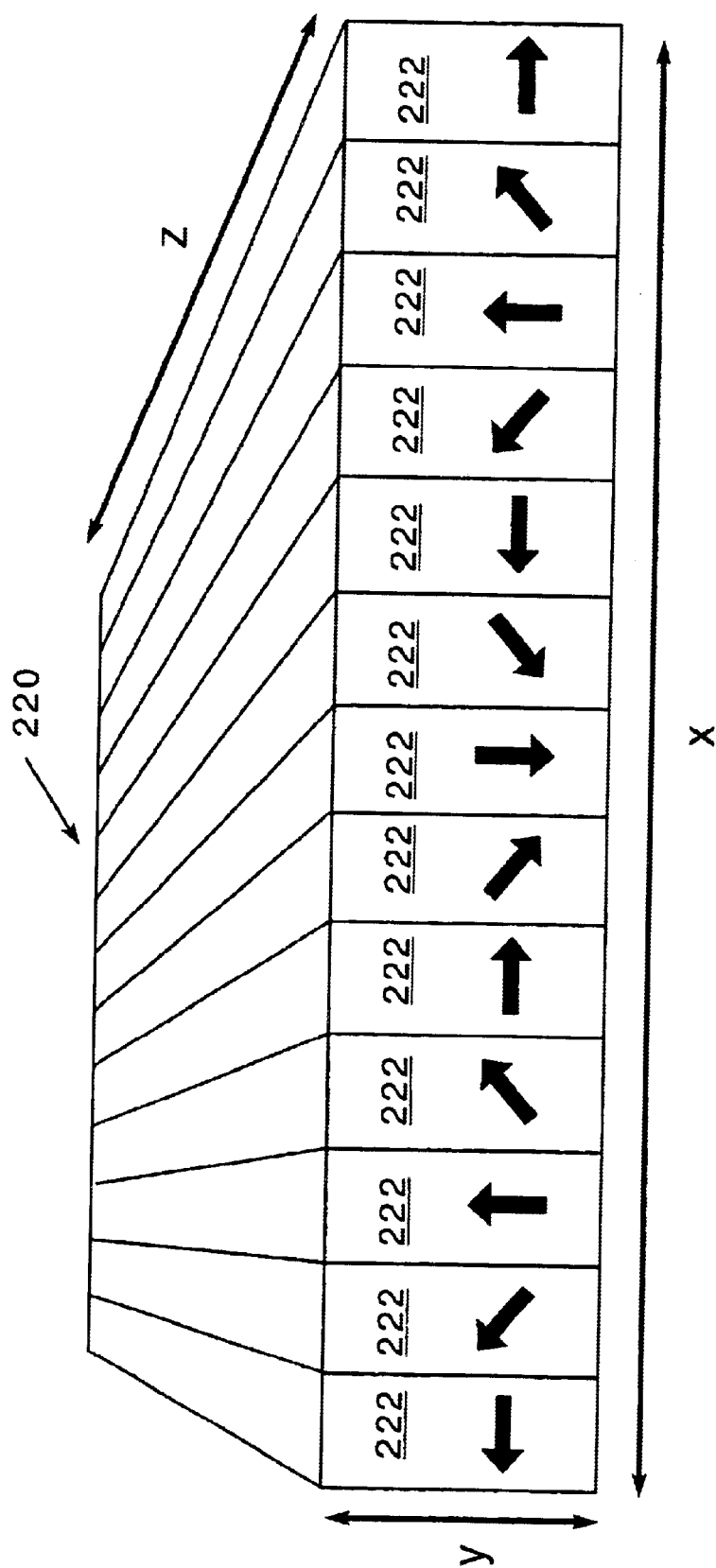
FIG. 9 is a diagram illustrating a Halbach magnet array according to one embodiment of the present invention.

FIG. 9 is a diagram illustrating a Halbach magnet array 220 according to one embodiment of the present invention. A Halbach magnetic array is a series of magnets which are so arranged as to simulate a magnetic monopole. The result is a magnetic assembly which, unlike most other magnetic devices, exhibits magnetic attraction predominantly on a single surface. The Halbach array uses the power of the magnet elements which comprise it in an efficient manner to produce a magnetic device of unusual strength and ability to throw magnetic flux across significant air gaps. A Halbach device might be composed of 4 or more magnetic elements with each element having a different axis of magnetic orientation. The change in orientation from one element to the next may be 90 degrees or less. Magnetic elements may be arranged in a straight line, a circular fashion or a variety of other manners to achieve the same effect. The Halbach array 220 is used for the magnets 40 of the device 10 according to one embodiment of the present invention. The Halbach array 220 includes permanent magnet bars 222 arranged and oriented in such a way that the magnetic field of the array 220, which varies periodically in space along the array, is concentrated on one face of the array 220 and almost canceled on the opposite face (See FIG. 10). The magnetic orientation (i.e. 0 degrees, 45 degrees, and 90 degrees) of each of the bars 222, according to one embodiment of the present invention, is indicated with an arrow. According to one embodiment of the present invention, each of the bars 222 may be, for example, 45 MGOe Neodymium (uncoated).

The array 220 includes 3 array cycles (i.e. 13 bars 220). However, various embodiments may use a differing number of cycles such as, for example, 1 cycle (i.e. 5 bars 220) or 2 cycles (i.e. 9 bars 220). In one embodiment, the x dimension of the array 220 is 6.75 in., the y dimension of the array 220 is 2 in., and the z dimension of the array 220 is 8.5 in.

Figure 10:
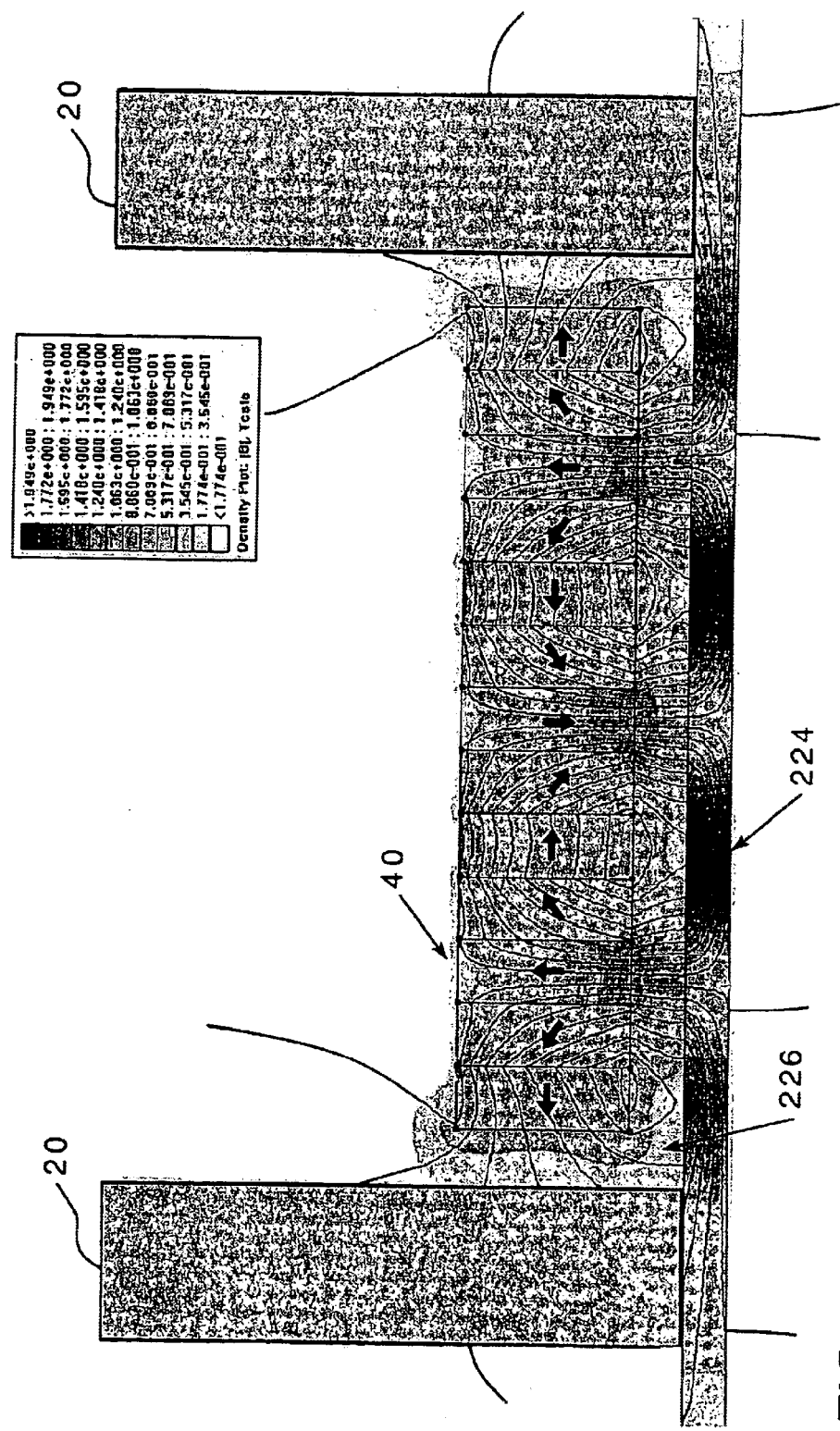
FIG. 10 is a diagram illustrating the magnetic fields of the Halbach magnet array of FIG. 9 according to one embodiment of the present invention.

FIG. 10 is a diagram illustrating the magnetic fields of the Halbach magnet array 220 of FIG. 9 according to one embodiment of the present invention. In FIG. 10, the array 220 is included as one of the magnets 40 of the device 10. The wheels 20 of the device 10 contact a ferromagnetic surface 224 on which the device 10 is operating. The magnet 40 does not contact the surface 224 but, rather, due to the orientation of the magnetic fields emanating from the magnet 40 as denoted by the shaded areas of FIG. 10, the magnet 40 is separated from the surface 224 by an air gap 226. The magnet 40 provides the necessary force required to hold the device 10 on the surface 224, even though the magnet 40 does not contact the surface 224 and even though there may be one or more layers of paint or coatings on the side of the surface 224 on which the device 10 is operating. The magnet 40 likewise provides sufficient force to hold the device 10 when the device 10 operates in an inverted (e.g. upside-down) or vertical position. In one embodiment, the air gap 226 is a ⅝ in. air gap. As illustrated in FIG. 10, the magnet 40 does not ride on the surface 224 and, thus, the magnet 40 will not mar the surface 224 during operation of the device 10. Because the magnet 40 does not contact the surface 224, the device 10 is able to traverse concave or convex and/or inverted surfaces that contain surface irregularities, dents, etc. because the wheels 20 provide the sole contact of the device 10 with the surface 224.

Figure 11:
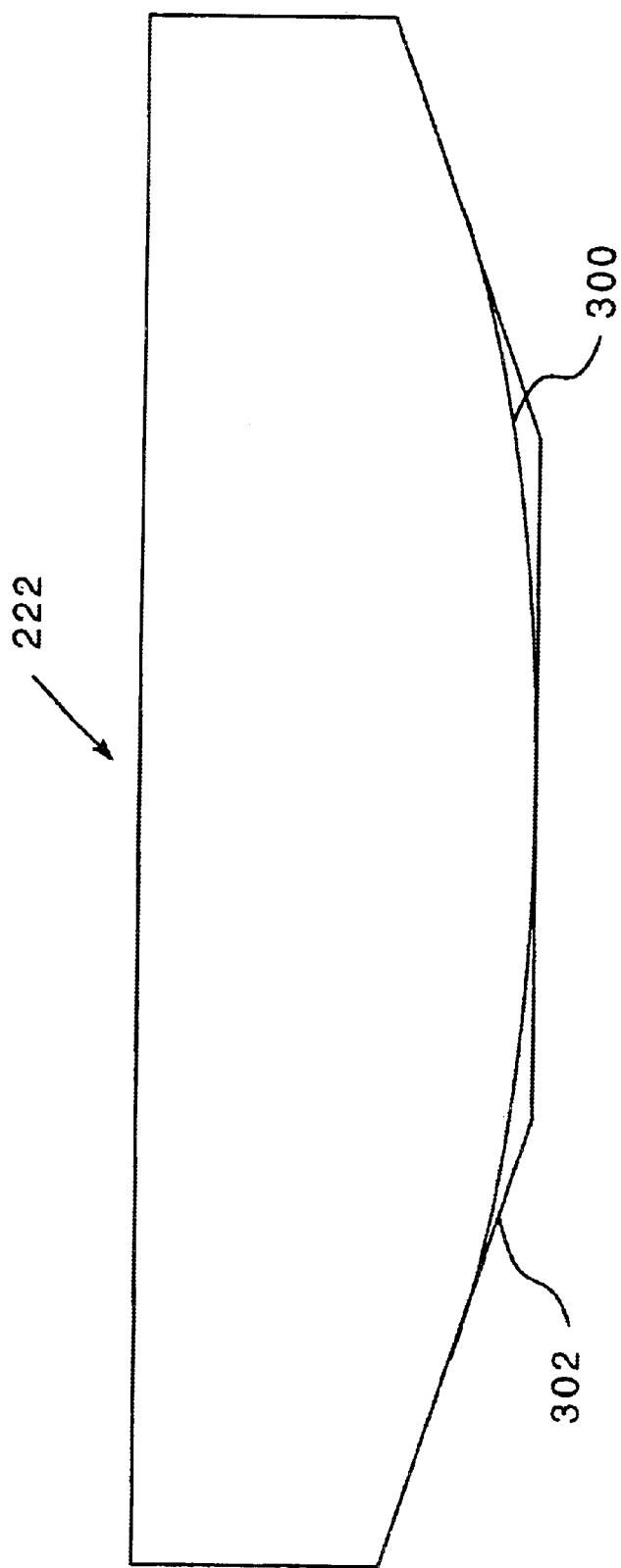
FIG. 11 is a diagram illustrating a side view of a magnet used in the Halbach magnet array of FIG. 9.

FIG. 11 is a diagram illustrating a side view of a magnet 222 used in the Halbach magnet array 220 of FIG. 9. FIG. 11 illustrates two embodiments of the shape of the bars 222 that comprise the array 220. The first embodiment, designated as 300, presents a curved working face and the second embodiment, designated as 302, presents a segmented working face.

The Halbach array 200 has many advantages over methods traditionally used to hold devices on ferromagnetic surfaces such as vacuum attachments, which are unreliable and impede movement of the device, magnetic wheels and tracks, which are heavy and which mar surfaces, and conventional magnetic arrays which provide one-third the holding power of a Halbach array for their weight. The high holding power of a Halbach array for its weight, and the ability of this type of magnet to throw its magnetic field farther than other types of magnetic solutions makes it possible to build a device with unprecedented performance on ferromagnetic surfaces.

Figure 12:
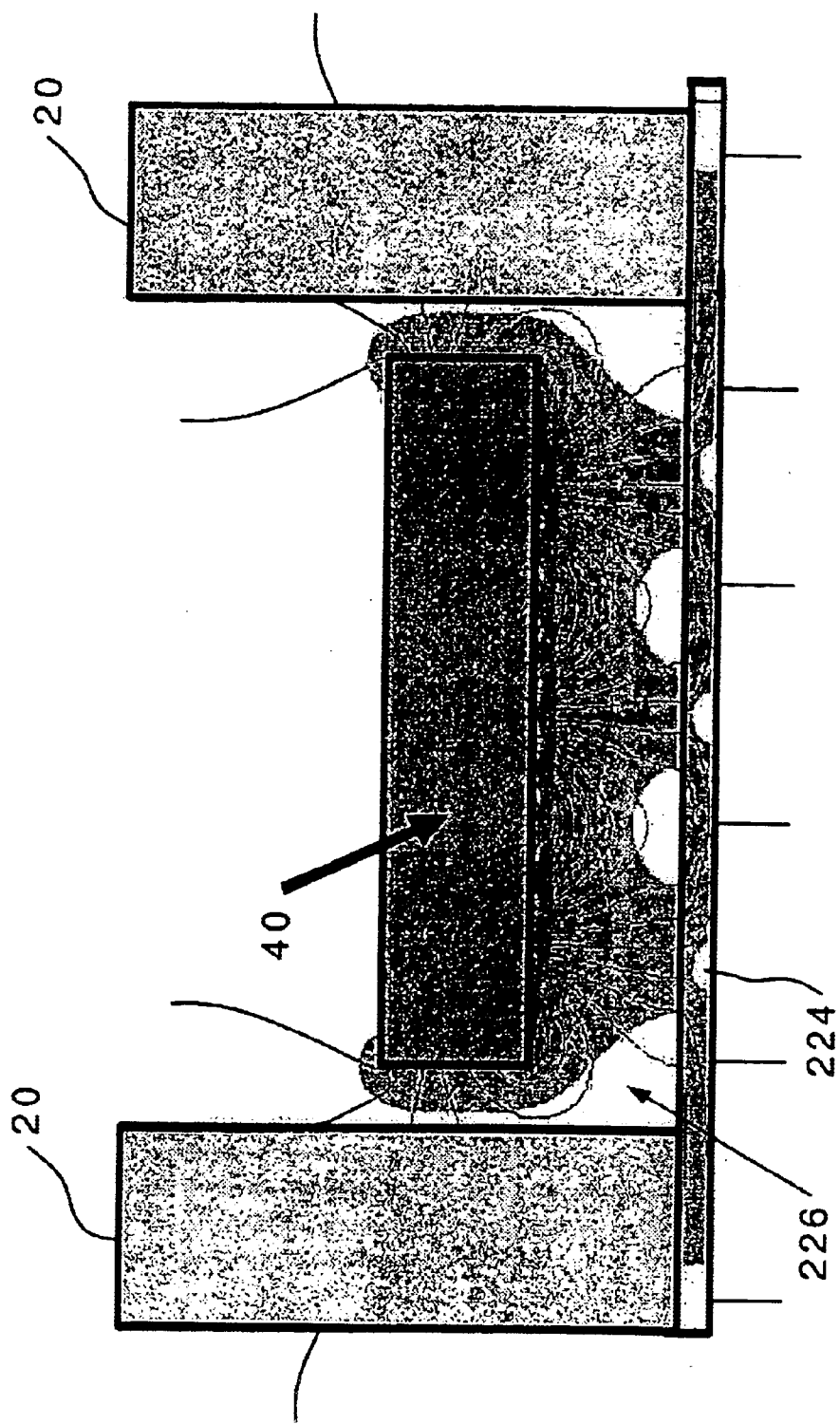
FIG. 12 is a diagram illustrating detection of lift off according to one embodiment of the present invention.

FIG. 12 is a diagram illustrating detection of lift off according to one embodiment of the present invention. If the magnet 40 starts to lose sufficient force to adhere the device 10 to the surface 224, the size of the air gap 226 becomes increasingly larger until the wheels 20, and thus the device 10, lose contact with the surface 224. Thus, if either the size of the air gap 226 or the magnetic flux at the surface 224 can be measured using appropriate sensors located on the device 10, the operator of the device 10 may be alerted that the device 10 is about to lose contact with the surface and the operator may take corrective action. Alternatively, the device 10 may automatically take self-correcting action such that the device 10 does not lose contact with the surface 224.

Figure 13:
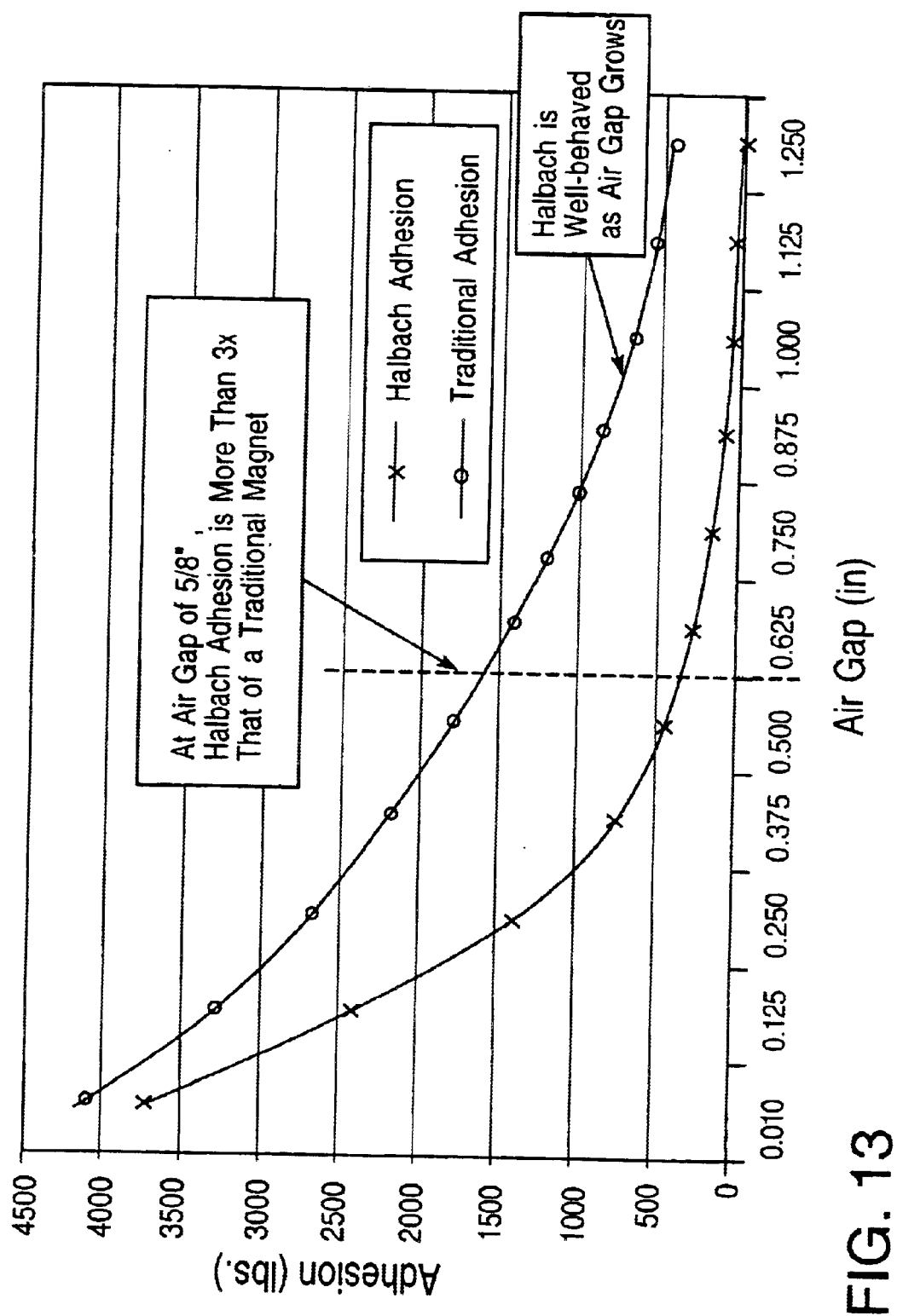
FIG. 13 is a graph which illustrates the difference between the holding power of a Halbach array and the holding power of a conventional, multi-pole magnet array with iron pole pieces which has identical mass.
Figure 13:
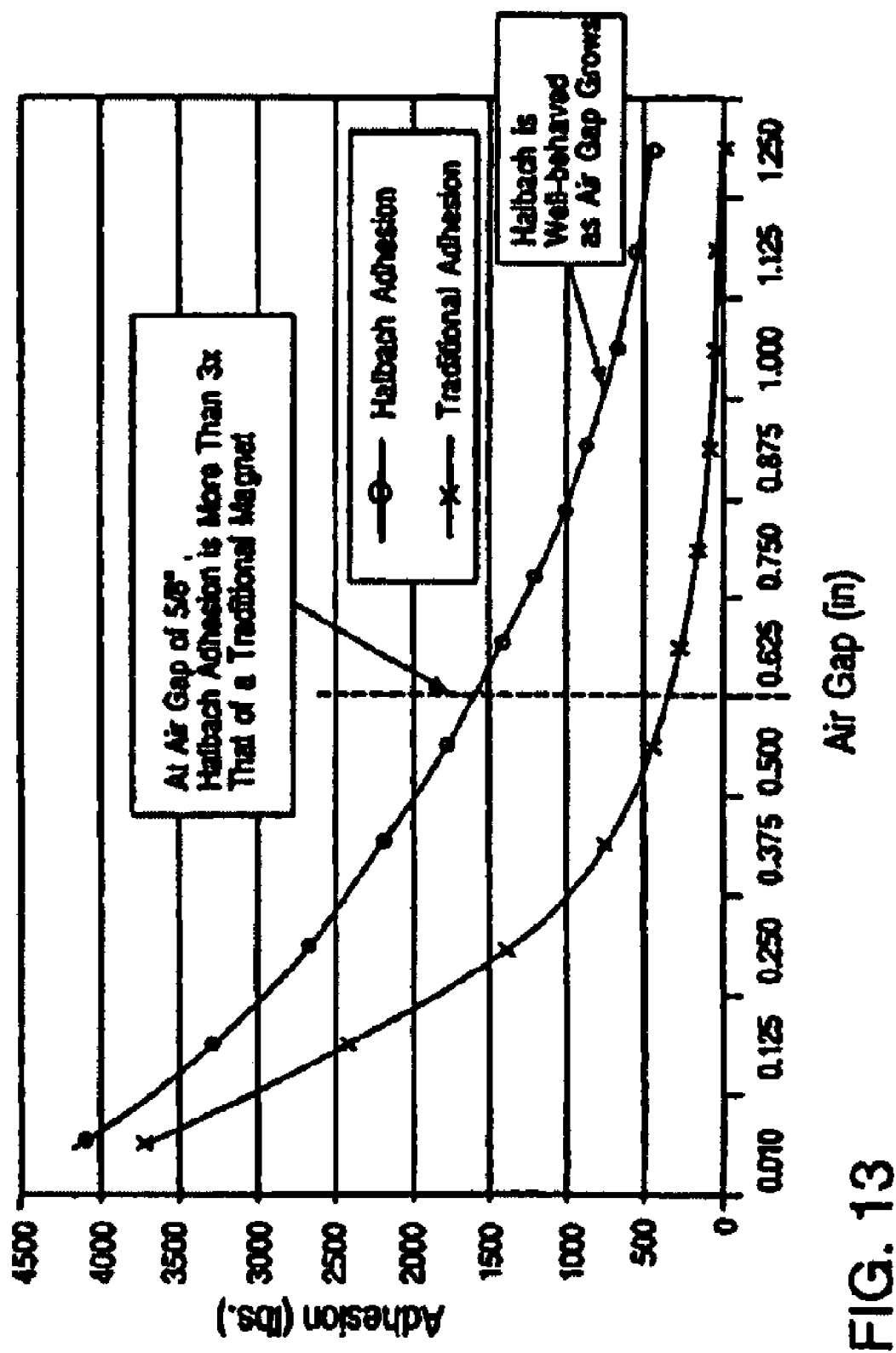

FIG. 13 is a graph which illustrates the difference between the holding power of a Halbach array and the holding power of a conventional, multi-pole magnet array with iron pole pieces which has identical mass. It can be seen in FIG. 13 that the Halbach array solution is very substantially more efficient with any reasonable air gap. This efficiency is what makes a Halbach-equipped device, as described herein, well-suited to operation on vertical and inverted ferromagnetic surfaces where high holding power and light weight are essential.

In various embodiments, the device 10 may be equipped with automated mobility features that enable the device 10 to be operated more efficiently. Such features may be implemented and controlled by the automation computer 80. One such feature is termed "cut-line tracking cruise control." This feature may be useful when the device 10 is used to strip paint or coatings from a surface. During operation, the device 10 may make various straight-line passes over an area, with each successive pass overlapping slightly with the immediately-prior pass. Although such overlap ensures complete coverage of the device 10, it may be difficult for an operator of the device 10 to consistently operate the device 10 with an overlap that is neither too small nor too large.

The device 10 may thus employ, for example, a forward-looking camera that can sense, using, for example, a computer vision algorithm, a cut line that demarcates the area on which the device 10 has operated from the area on which the device 10 has not operated. Such a computer vision algorithm may be, for example, an algorithm that relies on a color histogram-based correlation to find likely cut line points, and an aggressive line fitting algorithm to fit the most likely cut line. Because the device 10 can detect the cut line, the device 10 may automatically follow the cut line with little or no operator intervention.

Another automated feature is termed the "paint residue cruise control." This feature may be useful when the device 10 is used to strip paint or coatings from a surface. As the device 10 operates, a slower speed may strip more paint or coating and a faster speed may strip less paint or coating. Because paint and coating thicknesses may vary from surface to surface or from one part of a surface to another, it may be difficult to operate the device 10 at a uniform speed and effectively remove all of the paint or coating. The device 10 may thus employ a reverse-looking camera that monitors the surface that is being stripped. The camera may feed images to an algorithm that has been trained from a set of sample images to recognize the statistical color characteristics of the stripped surface (e.g. bare steel). The algorithm may compute the percentage of paint or coating left on the surface that has been stripped and thus the device 10 may be automatically slowed if all of the paint or coating has not been removed.

The systems, methods, and techniques discussed herein allow for an improved device that allows for the use of non-surface marring wheels, provides for better traction on surfaces, provides for better maneuverability and obstacle clearing, does not mar or scratch surfaces, and provides a light weight and low cost magnetic assembly that has a high magnetic holding power.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A robotic device for operating on a ferromagnetic surface, comprising:
   a frame;
   a lifting/safety ring attached to the frame;
   a strain relief connector attached to the lifting/safety ring;
   at least one wheel attached to the frame, wherein the wheel has a polymeric coating on a surface that is configured to contact the ferromagnetic surface; and
   a Halbach magnet array attached to the frame, wherein the magnet array holds the wheel in substantially constant contact with the ferromagnetic surface and wherein the Halbach array is configured in use to be spaced from the ferromagnetic surface.

2. The device of claim 1, further comprising a motor attached to the frame.

3. The device of claim 1, wherein the Halbach magnet array includes a plurality of magnetic bars, and wherein the magnetic bars are arranged such that a magnetic force created by the array extends substantially toward the ferromagnetic surface.

4. The device of claim 1, further comprising a steering system attached to the frame.

5. The device of claim 1, further comprising an actuation device attached to the frame.

* * * * *

UNITED STATES PATENT AND TRADEMARK OFFICE
CERTIFICATE OF CORRECTION

PATENT NO. : 6,792,335 B2
APPLICATION NO. : 10/153942
DATED : September 14, 2004
INVENTOR(S) : William P. Ross et al.

It is certified that error appears in the above-identified patent and that said Letters Patent is hereby corrected as shown below:

Title page,
Item [56], References Cited, OTHER PUBLICATIONS,
"Westernstates Manufacturing" reference, delete "200" and insert -- 2000 --.

Drawings,
Sheet 12, Figure 13, in the legend, associate "Halbach Adhesion" with the circle-marked line and "Traditional Adhesion" with the X-marked line as shown on attached page.

Column 8,
Line 18, delete "maybe" and insert -- may be --.

Signed and Sealed this

Twentieth Day of June, 2006

JON W. DUDAS
*Director of the United States Patent and Trademark Office*